(12) United States Patent
Tan

(10) Patent No.: US 9,478,015 B2
(45) Date of Patent: Oct. 25, 2016

(54) EXPOSURE ENHANCEMENT METHOD AND APPARATUS FOR A DEFOGGED IMAGE

(75) Inventor: Zhiming Tan, Shanghai (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/238,069

(22) PCT Filed: Sep. 6, 2012

(86) PCT No.: PCT/CN2012/001247
§ 371 (c)(1),
(2), (4) Date: Feb. 10, 2014

(87) PCT Pub. No.: WO2013/040857
PCT Pub. Date: Mar. 28, 2013

(65) Prior Publication Data
US 2014/0198993 A1    Jul. 17, 2014

(30) Foreign Application Priority Data

Sep. 20, 2011   (CN) .......................... 2011 1 0288962

(51) Int. Cl.
*G06K 9/40*  (2006.01)
*G06T 5/00*  (2006.01)

(52) U.S. Cl.
CPC ............ *G06T 5/003* (2013.01); *G06T 5/009* (2013.01); *G06T 2207/10004* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 8,249,303 B2* | 8/2012 | Nitanda | 382/104 |
| 8,396,324 B2 | 3/2013 | Kang et al. | |
| 8,755,628 B2* | 6/2014 | Fang et al. | 382/274 |
| 2010/0040300 A1* | 2/2010 | Kang et al. | 382/255 |
| 2010/0067823 A1* | 3/2010 | Kopf et al. | 382/274 |
| 2013/0259360 A1* | 10/2013 | Bingrong et al. | 382/154 |
| 2014/0140619 A1* | 5/2014 | Mukhopadhyay et al. | 382/167 |

FOREIGN PATENT DOCUMENTS

| | | |
|---|---|---|
| CN | 101459763 | 6/2009 |
| CN | 101783012 | 7/2010 |
| CN | 101950416 | 1/2011 |
| JP | 2006-18740 | 1/2006 |
| JP | 2012-221237 | 11/2012 |

OTHER PUBLICATIONS

Lv et al, Real-time Dehazing for Image and Video, 2010 18th Pacific Conference on Computer Graphics and Applications.*
Narasimhan et al, Contrast Restoration of Weather Degraded Images, IEEE Transactions on Pattern Analysis and Machine Intelligence, vol. 25, No. 6, Jun. 2003.*

(Continued)

*Primary Examiner* — Andrae S Allison
(74) *Attorney, Agent, or Firm* — Staas & Halsey LLP

(57) ABSTRACT

An exposure enhancement method and apparatus for a defogged image. The exposure enhancement method includes: constructing an exposure enhancement function in accordance with a defogging parameter; performing exposure enhancement on a defogged image by using the constructed exposure enhancement function. The method and apparatus can adaptively process the defogged image according to the defogging parameter and can process pixels in the defogged image in parallel.

7 Claims, 2 Drawing Sheets

(56) References Cited

OTHER PUBLICATIONS

Z. Tan, X. Bai, B. Wang and A. Higasi, "Fast Single-Image Defogging," FUJITSU, vol. 64, No. 5, pp. 523-528, 2013.*

Inhye Yoon; Jaehwan Jeon; Jinhee Lee; Joonki Paik, "Weighted image defogging method using statistical RGB channel feature extraction," SoC Design Conference (ISOCC), 2010 International, vol., No., pp. 34,35, Nov. 22-23, 2010.*

Aiming He; Jian Sun; Xiaoou Tang, "Single Image Haze Removal Using Dark Channel Prior," Pattern Analysis and Machine Intelligence, IEEE Transactions on, vol. 33, No. 12, pp. 2341,2353, Dec. 2011.*

Chieppa, Numerical algorithms for curve approximation and novel user oriented interactive tools, Universita Degli Studi Di Bari 'Dottorato di Ricerca in Matematica XXI Ciclo—A.A. 2008/2009.*

Narasimhan, S. G., and Nayar, S. K. 2003. Interactive (De)weathering of an Image using Physical Models. In ICCV Workshop on Color and Photometric Methods in Computer Vision (CPMCV).*

International Search Report mailed Nov. 29, 2012 in corresponding International Patent Application No. PCT/CN2012/001247.

Chinese Office Action issued Oct. 23, 2014 in corresponding Chinese Patent Application No. 201110288962.8.

Japanese Office Action issued Jan. 5, 2016 in corresponding Japanese Patent Application No. 2014-530076, 1 page.

Japanese Office Action issued May 17, 2016 in corresponding Japanese Patent Application No. 2014-530076, 1 page.

\* cited by examiner

EXPOSURE ENHANCEMENT METHOD AND APPARATUS FOR A DEFOGGED IMAGE

CROSS-REFERENCE TO RELATED APPLICATIONS

This application is a U.S. national stage application of PCT/CN2012/001247 filed Sep. 6, 2012 and claims foreign priority benefit of Chinese Application No. 201110288962.8 filed Sep. 20, 2011 in the Chinese Intellectual Property Office, the contents of both of which are incorporated herein by reference.

FIELD OF THE INVENTION

The invention relates to image processing, particularly relates to an exposure enhancement method and apparatus for a defogged image.

BACKGROUND OF THE INVENTION

Image defogging is a technique for removing fog in a foggy image to make image contents more visible. However, a defogged image obtained by defogging processing usually is relatively dark, and contents in the defogged image sometimes are not visible enough for a person to clearly recognize. Therefore, the exposure of the defogged image needs to be enhanced.

Currently, there exist the following two exposure enhancement methods for the defogged image:

The first method is an image transforming method based on pixel intensity values. The method includes log transformation, gamma transformation, and piecewise linear transformation. The log transformation and the gamma transformation need complex operations, and much computation time is needed. The piecewise linear transformation cannot provide a continuous transformation function, leading to the obtained result not ideal.

The second method is an image transforming method based on histogram transformation. The method firstly computes the histogram of an input image, and then performs histogram equalization and histogram matching, etc. The effect of the resultant image obtained by the method is very bad, and almost all noises are shown. In addition, it is difficult to implement the image transformation method based on histogram transformation in parallel.

SUMMARY OF THE INVENTION

In view of one or more problems described above, a novel exposure enhancement method and apparatus for a defogged image is provided.

An exposure enhancement method for a defogged image in accordance with an embodiment of the invention comprises: constructing an exposure enhancement function in accordance with a defogging parameter; and performing exposure enhancement on a defogged image by using the constructed exposure enhancement function.

An exposure enhancement apparatus for a defogged image in accordance with an embodiment of the invention comprises: a function constructing unit for constructing an exposure enhancement function in accordance with a defogging parameter; and an exposure enhancement unit for performing exposure enhancement on a defogged image by using the constructed exposure enhancement function.

The invention can adaptively process the defogged image according to the defogging parameter and can process pixels in the defogged image in parallel.

BRIEF DESCRIPTION OF THE DRAWINGS

The invention can be better understood from the following descriptions of the embodiments of the invention in combination with the accompany drawings, wherein.

DETAILED DESCRIPTION OF THE INVENTION

Features of respective aspects and example embodiments of the invention will be described in detail below. The following descriptions involve many specific details so as to provide thorough understanding of the invention. However, it is obvious to the person skilled in the art that the invention can be implemented without some of the specific details. The following descriptions of the embodiments are merely for providing clearer understanding of the invention by means of illustrating examples of the invention. The invention is not limited to any specific configuration and algorithm provided below, and covers any modification, alteration and improvement of relevant elements, components and algorithms without going beyond the spirit of the invention.

It is desired to provide an exposure enhancement method and apparatus for a defogged image, wherein the method and apparatus can adaptively perform exposure enhancement on a defogged image to obtain a relatively good processing result, and can perform exposure enhancement on the defogged image in parallel.

As an image defogging method for a foggy image, an image defogging method based on dark channel prior is widely used. Specifically, in the image defogging method based on dark channel prior, an intensity value J of a defogged image is solved in accordance with a foggy image model I=Jt+A(1−t) by using an intensity value I, an air light value A, and a transmission map t of a foggy image, i.e.

$$J = \frac{I-A}{t} + A,$$

wherein acquiring the transmission map t is a very important step.

In the image defogging method based on dark channel prior, the transmission map t can be calculated in accordance with t=1−ω·f(I/A), wherein f( ) represents an existing algorithm for calculating the transmission map t, and ω(ω∈[0,1]) is a defogging parameter for controlling the defogging degree of the foggy image. The larger the value of the defogging parameter ω is, the defogged image obtained by defogging will be darker; on the contrary, the less the value of the defogging parameter ω is, the defogged image obtained by defogging will be brighter. A user can obtain a desired defogging effect by setting the defogging parameter ω as required.

In actual, if the defogged image is made brighter by simply setting the defogging parameter ω to a relatively small value, a case that the brightness of the defogged image is relatively high and its contrast is lowered may occur. At this time, the user cannot clearly recognize image contents, either.

Figure 1:
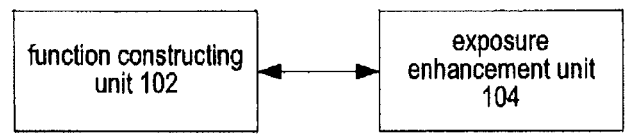
FIG. 1 illustrates an exposure enhancement apparatus for a defogged image in accordance with an embodiment of the invention.
Figure 2:
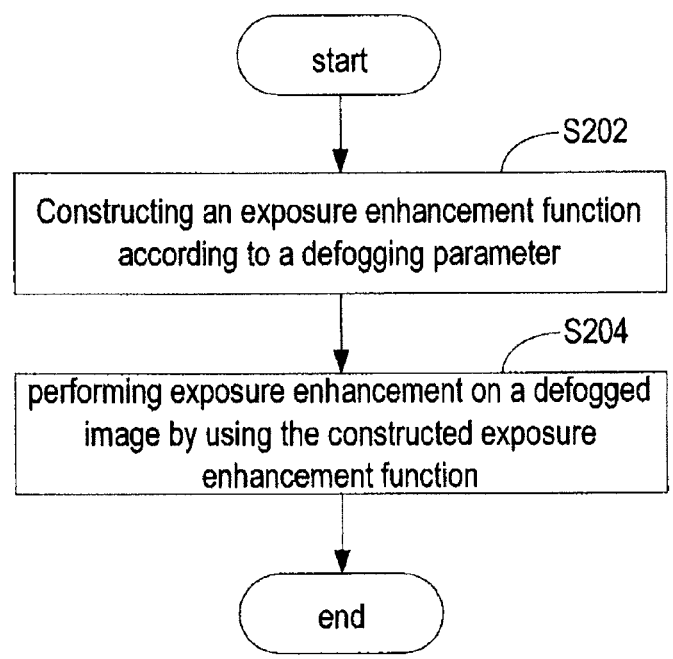
FIG. 2 illustrates an exposure enhancement method for a defogged image in accordance with an embodiment of the invention.

In order to make the defogged image brighter and clearer, the invention provides a novel exposure enhancement apparatus and method for a defogged image. FIG. 1 illustrates an exposure enhancement apparatus for a defogged image in accordance with an embodiment of the invention. FIG. 2 illustrates an exposure enhancement method for a defogged image in accordance with an embodiment of the invention.

As shown in FIG. 1, the exposure enhancement apparatus for a defogged image in accordance with an embodiment of the invention comprises a function constructing unit 102 and an exposure enhancement unit 104, wherein the function constructing unit 102 is used for constructing an exposure enhancement function according to a defogging parameter ω (i.e. implementing step S202 in FIG. 2), and the exposure enhancement unit 104 is used for performing exposure enhancement on a defogged image by using the exposure enhancement function (i.e. implementing step S204 in FIG. 2).

Figure 3:
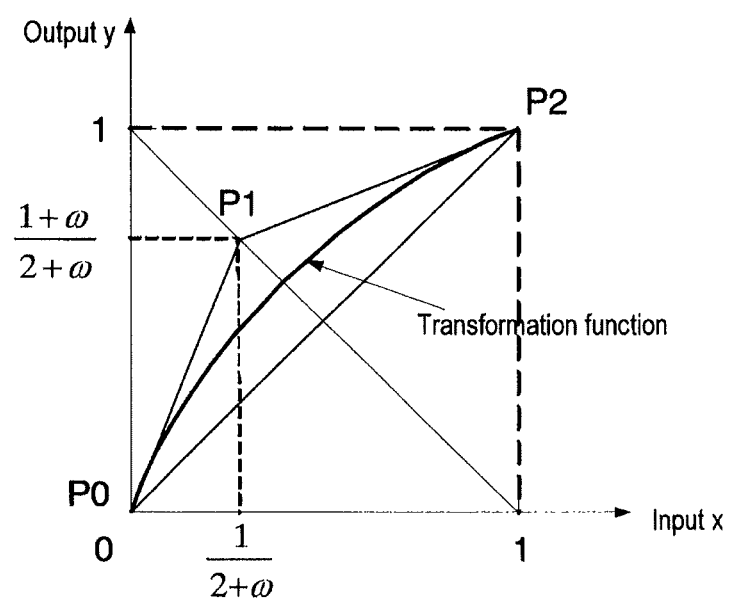
FIG. 3 illustrates a diagram of the processing of constructing an exposure enhancement function.

Below, taking normalized input pixel values and normalized output pixel values as an example, the exposure enhancement apparatus and method for a defogged image in accordance with an embodiment of the invention are described. FIG. 3 illustrates a diagram of the processing of constructing an exposure enhancement function, wherein the horizontal axis represents the normalized input pixel values, the vertical axis represents the normalized output pixel values, and the input and output pixel values are values in a range of [0,1].

Below, the processing of constructing the exposure enhancement function is described in detail.

Firstly, as shown in FIG. 3, a straight line y=(1+kω)x (k>0) passing through the origin, the slope of which is larger than 1, is constructed by using the defogging parameter ω, and coordinates of an intersecting point P1 of the straight line y=(1+kω)x and a straight line y=−jx+1 (j>0) are calculated. That is to say, the value of "j" must meet a condition that the intersecting point P1 is located in the upper left of a straight line P0P2 connecting a point P0(0,0) and a point P2(1,1). Below, descriptions are made taking k=1, j=1 as an example. In the case of k=1, j=1, the coordinates of the point P1 are $$\left(\frac{1}{2+\omega}, \frac{1+\omega}{2+\omega}\right).$$

Next, a quadratic Bezier function, i.e. a parabola function is constructed taking a triangle having vertexes P0(0,0), P1

$$\left(\frac{1}{2+\omega}, \frac{1+\omega}{2+\omega}\right),$$

and P2(1,1) as a control triangle, and the constructed quadratic Bezier function is taken as the exposure enhancement function.

Specifically, the quadratic Bezier function is constructed by taking P0(0,0) as a start point, P1

$$\left(\frac{1}{2+\omega}, \frac{1+\omega}{2+\omega}\right)$$

as an intermediate point, and P2(1,1) as a terminal point. As the quadratic Bezier function is a parabola function, the function can be written as y=ax²+bx, wherein $$a = -\frac{8\omega^2 + 16\omega}{3\omega^2 + 16\omega + 16},$$

b=1−a.

After the function constructing unit 102 constructs the exposure enhancement function, the exposure enhancement unit 104 uses the exposure enhancement function to perform exposure enhancement on the defogged image. Specifically, the exposure enhancement unit 104 calculates intensity values $O_{(r,g,b)}$ of R, G, B channels of every pixel in the exposure enhanced image. Obviously, exposure enhancement is performed with respect to every pixel (i.e. exposure enhancement is performed with respect to all pixels in the defogged image in parallel), and the exposure enhancement function is dependent on the defogging parameter and has relatively low computation complexity (merely including addition and multiplication operations).

The above descriptions are made taking the case of k=1, j=1 as an example. However, the person skilled in the art will appreciate that as for cases that k and j take other values, except that the coordinate values of the intermediate point P1 slightly change and the expression of "a" in y=ax²+bx slightly changes, other aspects are the same as the above described.

In addition, the above descriptions are made taking the normalized input pixel values and the normalized output pixel values as an example. However, the person skilled in the art will appreciate that in the case of not using the normalized input and output pixel values, the quadratic Bezier function can be similarly constructed by taking a triangle having vertexes of P0(0,0), an intersecting point P1 of the straight line y=(1+kω)x and a straight line y=−jx+255, and P2(255,255) as the control triangle, and exposure enhancement on the defogged image is performed by using the quadratic Bezier function.

As compared with existing exposure enhancement methods for a defogged method, the invention has the following advantages: 1) it can adaptively processes the defogged image according to the defogging parameter; 2) it can processes pixels in the defogged image in parallel with low computation complexity; 3) it can obtain a relatively good exposure enhancement result by using a continuous exposure enhancement function.

The invention is described above in reference with specific embodiments of the invention. However, the person skilled in the art will appreciate that various modification, combination and alteration can be made to these specific embodiments without departing from the spirit and scope defined by the accompany claims and equivalent thereof.

The steps can be implemented by hardware or software as required. Note, steps can be added to or deleted from the flowchart shown in the specification, and steps in the flowchart can be modified without departing from the scope of the invention. In general, the flowchart is merely used to indicate a possible sequence of basic operations for implementing functions.

The embodiments of the invention can be implemented by using a programmed general digital computer, an application-specific integrated circuit, a programmable logic element, a field-programmable gate array, an optical, chemical, biological, quantum or nano-engineering system, component or infrastructure. In general, functions of the invention can be implemented by any well-known means in the art. Distributed or networked systems, components or circuits can be used. Communication or transmission of data can be wired, wireless, or by any other means.

It will be appreciated that in accordance with requirements of a particular application, one or more of elements shown in the accompany drawings can be implemented in a more discrete or integrated mode, or even be removed or disabled in some cases. Implementing programs or codes that can be stored in a machine-readable medium to allow a computer implement the above method is also within the spirit and scope of the invention.

In addition, any signal arrow in the accompany drawings shall be deemed as exemplary rather than limited, unless otherwise specifically indicated. When a term is predicted to make a capability of separating or combining unclear, the combination of components or steps will be deemed as having been described.

What is claimed is:

1. An exposure enhancement method for a defogged image, comprising:
   constructing an exposure enhancement function in accordance with a defogging parameter, the defogging parameter controlling a defogging degree of a foggy image and being set by a user; and
   performing exposure enhancement on a defogged image by using the constructed exposure enhancement function, wherein
   the exposure enhancement function is a quadratic Bezier function, and
   the constructing the quadratic Bezier function comprises:
      under the condition that normalized input pixel values and normalized output pixel values are employed, constructing a straight line $y=(1+k\omega)x$, which passes through the origin and has a slope larger than 1, by using the defogging parameter, and calculating coordinates of an intersection point "P1" of the straight line $y=(1+k\omega)x$ and a straight line $y=-jx+1$, wherein both "j" and "k" are larger than zero;
      constructing a control triangle by taking the origin P0(0,0), the intersection point "P1" of the straight line $y=(1+k\omega)x$ and the straight line $y=-jx+1$, and a boundary point P2(1, 1), the coordinates of which are the maximum values of the normalized input pixel values and the normalized output pixel values, as vertexes; and
      constructing the quadratic Bezier function in the control triangle.

2. The exposure enhancement method of claim 1, characterized in constructing the quadratic Bezier function by taking the origin "P0" as a start point, the intersection point "P1" as a middle point, and the boundary point "P2" as a termination point.

3. The exposure enhancement method of claim 1, characterized in that the processing of performing exposure enhancement on the defogged image by using the exposure enhancement function comprises: for any one of R, G, B channels of any one pixel in the defogged image, calculating the exposure enhanced intensity value of the channel by using the exposure enhancement function and the intensity value of the channel.

4. An exposure enhancement apparatus for a defogged image, comprising:
   at least one memory storing computer executable instructions;
   at least one processor that executes the computer executable instructions to cause the following to be performed by the exposure enhancement apparatus:
      constructing an exposure enhancement function in accordance with a defogging parameter, the defogging parameter controlling a defogging degree of a foggy image and being set by a user; and
      performing exposure enhancement on a defogged image by using the constructed exposure enhancement function, wherein
   the exposure enhancement function is a quadratic Bezier function, and
   the constructing the quadratic Bezier function comprises:
      under the condition that normalized input pixel values and normalized output pixel values are employed, constructing a straight line $y=(1+k\omega)x$, which passes through the origin and has a slope larger than 1, by using the defogging parameter, and calculating coordinates of an intersection point "P1" of the straight line $y=(1+k\omega)x$ and a straight line $y=-jx+1$, wherein both "j" and "k" are larger than zero;
      constructing a control triangle by taking the origin P0(0,0), the intersection point "P1" of the straight line $y=(1+k\omega)x$ and the straight line $y=-jx+1$, and a boundary point P2(1, 1), the coordinates of which are the maximum values of the normalized input pixel values and the normalized output pixel values, as vertexes; and
      constructing the quadratic Bezier function in the control triangle.

5. The exposure enhancement apparatus of claim 4, characterized in constructing the quadratic Bezier function by taking the origin "P0" as a start point, the intersection point "P1" as a middle point, and the boundary point "P2" as a termination point.

6. The exposure enhancement apparatus of claim 4, characterized in that the processing of performing exposure enhancement on the defogged image by using the exposure enhancement function comprises: for any one of R, G, B channels of any one pixel in the defogged image, calculating the exposure enhanced intensity value of the channel by using the exposure enhancement function and the intensity value of the channel.

7. An exposure enhancement method for a defogged image, comprising:
   obtaining an image by defogging processing;
   constructing an exposure enhancement function in accordance with a defogging parameter, the defogging parameter controlling a defogging degree of a foggy image and being set by a user; and
   performing exposure enhancement on the obtained image by using the constructed exposure enhancement function, wherein
   the exposure enhancement function is a quadratic Bezier function, and
   the constructing the quadratic Bezier function comprises:
      under the condition that normalized input pixel values and normalized output pixel values are employed, constructing a straight line $y=(1+k\omega)x$, which passes through the origin and has a slope larger than 1, by using the defogging parameter, and calculating coordinates of an intersection point "P1" of the straight line $y=(1+k\omega)x$ and a straight line $y=-jx+1$, wherein both "j" and "k" are larger than zero;

constructing a control triangle by taking the origin P0(0,0), the intersection point "P1" of the straight line $y=(1+k\omega)x$ and the straight line $y=-jx+1$, and a boundary point P2(1, 1), the coordinates of which are the maximum values of the normalized input pixel values and the normalized output pixel values, as vertexes; and constructing the quadratic Bezier function in the control triangle.

\* \* \* \* \*